United States Patent [19]
Wilson et al.

[11] Patent Number: 5,384,616
[45] Date of Patent: Jan. 24, 1995

[54] PHOTOGRAPHIC LIGHTING SYSTEM USING INCIDENT LIGHT METER

[75] Inventors: Anton F. Wilson, Hanover, N.H.; William V. Koskuba, Stratford, Conn.

[73] Assignee: Anton/Bauer, Inc.

[21] Appl. No.: 48,140

[22] Filed: Apr. 14, 1993

[51] Int. Cl.⁶ .............................. H01D 1/18
[52] U.S. Cl. .................... 354/414; 333/157
[58] Field of Search ............... 333/153, 156, 158, 157; 250/205; 354/127.1, 413, 414

[56] References Cited

U.S. PATENT DOCUMENTS

| | | | |
|---|---|---|---|
| 3,962,600 | 6/1976 | Pittman | 315/158 |
| 4,158,132 | 6/1979 | O'Dell | 230/205 |
| 4,368,406 | 1/1983 | Kruzich et al. | 315/158 |
| 4,587,457 | 5/1986 | Lind | 315/64 |
| 4,634,933 | 1/1987 | Kamon et al. | 315/156 |
| 4,658,129 | 4/1987 | Fan | 315/158 |
| 4,666,280 | 5/1987 | Miyawaki et al. | 354/414 |
| 4,959,755 | 9/1990 | Hochstein | 250/205 |
| 5,198,855 | 3/1993 | Iwai | 354/414 |

FOREIGN PATENT DOCUMENTS 0067623  7/1977  Japan .............................. 354/127.1

*Primary Examiner*—Robert J. Pascal
*Assistant Examiner*—Darius Gambino
*Attorney, Agent, or Firm*—Kramer, Brufsky & Cifelli

[57] ABSTRACT

A photographic lighting system for use with a camera provides fill light from the direction of the camera to alleviate shadows in a photographic image obtained by the camera. The photographic lighting system includes an incident light sensor for sensing the incident light intensity on a subject to be photographed, an electric light for directing fill light toward the subject, and a control circuit for controlling the intensity of the fill light provided by the electric light in response to the sensed incident light intensity. The fill light is increased in intensity as the incident light intensity increases. The control circuit can also receive a distance input representative of the distance between the electric light and the subject and controls the fill light in response to the distance input such that the fill light intensity at the subject is substantially independent of the distance. A sensitivity input to the control circuit permits the fill light intensity to be compensated for the sensitivity of the camera.

15 Claims, 3 Drawing Sheets

PHOTOGRAPHIC LIGHTING SYSTEM USING INCIDENT LIGHT METER

FIELD OF THE INVENTION

This invention relates to a photographic lighting system for use with a camera and, more particularly, to a photographic lighting system wherein shadows are alleviated by providing a fill light that increases in intensity as the incident light intensity increases.

BACKGROUND OF THE INVENTION

Most indoor spaces that are designed for human activity include artificial electric illumination to a level of at least 30 footcandles, with most work areas illuminated to 60 footcandles or more. This level of illumination is quite sufficient for all modern film and video cameras, which can record an image with 10 footcandles or less. Video camera manufacturers often encourage users to create video programs using nothing more than the available illumination. The video images thus created are usually quite unacceptable due to the fact that the available illumination is almost always in the form of ceiling or overhead lights. This type of illumination creates shadows on the face, dark eye sockets and black necks, and accentuates facial wrinkles. Furthermore, the forehead, nose and shoulders are significantly overbright and appear to be glowing. Thus, the available overhead light is often unacceptable for foreground subjects.

The use of built-in light meters in automatic cameras is well known. The iris of the camera is adjusted in accordance with the output of the light meter to compensate for factors such as film speed (camera sensitivity), shutter speed, and scene illumination. However, the shadowing problem described above is not alleviated.

A reflective light metering device has been incorporated into lights for home video cameras. The metering device determines the amount of light reflected off the subject in order to increase the output of the camera's onboard light in low light and to decrease the output in bright light. This is usually accomplished by a variable resistance in series with the light, which increases or decreases the voltage applied to the light bulb.

U.S. Pat. No. 4,666,280, issued May 19, 1987 to Miyawaki et al, discloses a flash unit wherein the degree of concentration of flash lighting is varied responsive to detection of a backlight situation. The concentration of the flash unit light is increased when the backlighting increases so as to match foreground subject illumination with the background.

U.S. Pat. No. 4,959,755, issued Sep. 25, 1990 to Hochstein, discloses a video camera including a light sensor for sensing ambient light and reflected radiant light from a scene. The lamp intensity is lowered when the ambient light level increases. This patent discusses U.S. Pat. No. 4,368,406 in which a light control includes an ambient light sensor wherein the light is raised and lowered in concert with the ambient light. The light control is for use with a lighted control panel for a vehicle or the like.

U.S. Pat. No. 4,587,457, issued May 6, 1986 to Lind, discloses a multiple-intensity controller with variable impedance which is responsive to ambient light levels and may be used to increase the output intensity with increases in ambient light levels. Use with a camera is not disclosed.

U.S. Pat. No. 3,962,600, issued Jun. 8, 1976 to Pittman, discloses a control circuit wherein ambient light is sensed and the light of a clock is controlled. The clock light is increased in intensity in concert with increases in the ambient light.

It is a general object of the present invention to provide an improved photographic lighting system.

It is another object of the present invention to provide a photographic lighting system wherein shadowing is alleviated.

It is a further object of the present invention to provide a photographic lighting system wherein fill light intensity is increased in concert with incident light so as to alleviate shadowing.

It is yet another object of the present invention to provide a photographic lighting system wherein fill light intensity is based on the intensity of incident light on a subject to be photographed.

SUMMARY OF THE INVENTION

According to the present invention, these and other objects and advantages are achieved in a photographic lighting apparatus for use with a camera. The lighting apparatus provides fill light from the direction of the camera to alleviate shadows in a photographic image. The photographic lighting apparatus of the invention comprises sensing means for generating an incident light signal representative of an incident light intensity on a subject to be photographed, electric light means for directing fill light toward the subject, and control circuit means for controlling the fill light provided by the electric light means in response to the incident light signal. The electric light means is controlled in accordance with a predetermined function such that the fill light is increased in intensity as the incident light intensity increases.

The sensing means can comprise an incident light meter adapted for mounting on the camera so as to sense incident light from above the camera. Typically, the incident light on the camera is approximately equal to the incident light on the subject.

The photographic lighting apparatus of the invention preferably includes means for generating a distance input representative of the distance between the electric light means and the subject. The control circuit means controls the fill light provided by the electric light means in response to the distance input as well as other inputs so that the fill light intensity at the subject is substantially independent of the distance between the electric light means and the subject. The means for generating a distance input can comprise means for sensing the distance, means for manually adjusting the distance input or means for coupling the distance input from the camera.

According to another feature of the invention, the photographic lighting apparatus preferably further includes means for providing a sensitivity input to the control circuit means. The sensitivity input is representative of the sensitivity of the camera, or for specific "fine tuning" of the lighting ratio, or compensation for the efficiency of a particular set of bulbs. The control circuit means controls the fill light provided by the electric light means in response to the sensitivity input so that the fill light intensity at the subject is compensated for the sensitivity of the camera, or bulb efficiency.

In accordance with a first embodiment, the electric light means can comprise a plurality of electric lamps. A predetermined fill light intensity is provided by energizing a selected number of the electric lamps. In a second embodiment, the electric light means comprises one or more electric lamps and means for attenuating the light output of the electric lamps in response to the control signal. In a third embodiment, the control circuit means includes means for varying the average power supplied to the electric light means, such as by pulse width modulation.

In accordance with another aspect of the invention, a method of photographic lighting for use with a camera comprises the steps of sensing an incident light intensity on a subject to be photographed, directing fill light toward the subject from the direction of the camera, and controlling the fill light directed toward the subject in accordance with a predetermined function such that the fill light is increased in intensity as the sensed incident light increases. The step of controlling the fill light preferably includes controlling the fill light in accordance with the distance between the electric light and the subject such that the fill light intensity at the subject is substantially independent of the distance.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
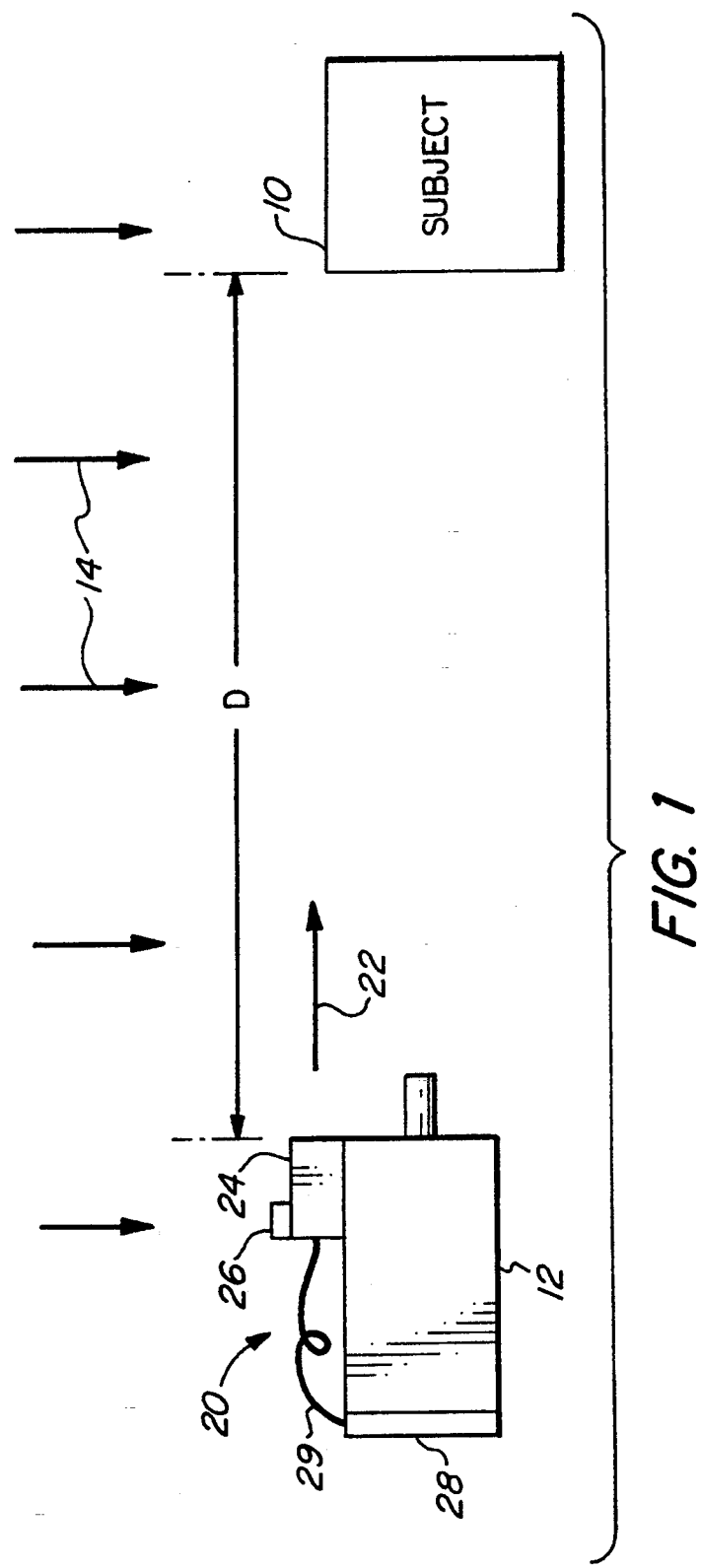
FIG. 1 is a schematic representation of the lighting apparatus and method in accordance with the invention.

A schematic representation of a camera using a photographic lighting system in accordance with the present invention is shown in FIG. 1. A subject 10 is to be photographed by a camera 12. As used herein, "camera" refers to either a video camera or a film camera. Incident light, as indicated by arrows 14, illuminates subject 10 from above. The incident light is typically provided by overhead or ceiling lighting. The incident light is assumed to be sufficient for use of the camera. However, the incident light from above produces objectionable shadows in photographic images obtained by camera 12.

In accordance with the present invention, a photographic lighting system 20 provides fill light as indicated by arrow 22 from the direction of camera 12 to alleviate shadows in the photographic images obtained by camera 12. The photographic lighting system includes an electric light unit 24, an incident light sensor 26 and a control circuit 28. The light unit 24 and light sensor 26 are interconnected to control circuit 28 by an electrical cable 29. It will be understood that the electric light unit 24, the incident light sensor 26 and the control circuit 28 can be packaged separately as shown in FIG. 1, together in one unit, or in any other suitable packaging arrangement, within the scope of the present invention. Furthermore, the photographic lighting system 20 can be mounted on camera 12 or can be a separate unit. It is preferred for convenience of use that the photographic lighting system 20 be mounted on camera 12.

Figure 2:
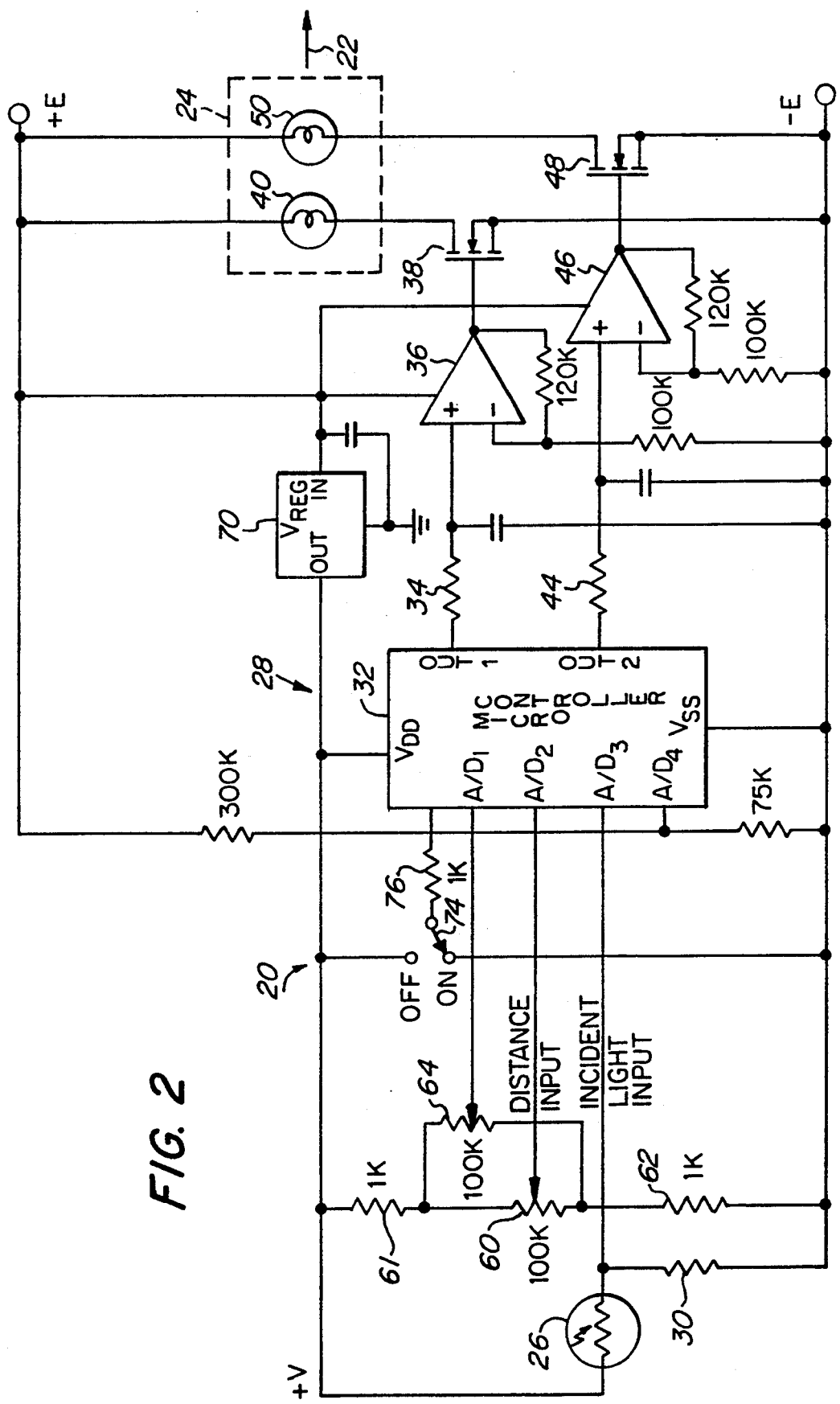
FIG. 2 is a schematic diagram of the photographic lighting apparatus of the invention.

A schematic diagram of one embodiment of the photographic lighting system 20 is shown in FIG. 2. The incident light sensor 26 can be a photocell or similar light sensing device. The incident light sensor 26 is directed upwardly so as to receive incident light from above. It is assumed that the intensity of incident light at the camera location is approximately the same as the intensity of incident light at the subject location. A resistor 30 is connected in series with the incident light sensor 26 between a voltage $+V$ and reference voltage $-E$ or ground. The incident light sensor 26 is connected to an analog input of a microcontroller 32. The microcontroller 32 can be of the type that includes analog-to-digital converters so that analog input voltages can be connected directly to the device. One example of a suitable microcontroller is a type 87C752 manufactured by Signetics.

A first output of the microcontroller 32 is connected through a resistor 34 to an input of a level shift circuit 36, which can be type LM-358. The output of level shift circuit 36 is connected to the gate of a MOS FET transistor 38. The drain of transistor 38 is connected to a lamp 40 of light unit 24. The source of transistor 38 is connected to a reference voltage $-E$ or ground. A second output of microcontroller 32 is connected through a similar circuit including resistor 44, level shift circuit 46 and MOS FET transistor 48. The drain of transistor 48 is connected to a lamp 50 of light unit 24. In general, microcontroller 32 energizes one, both or neither of lamps 40 and 50 to provide a desired fill light intensity. The fill light intensity depends in part on the sensed intensity of incident light as described below.

A second input to microcontroller 32 is a distance input, which represents the distance D between light unit 24 and subject 10. Since the intensity of fill light at subject 10 is inversely proportional to the square of the distance D, the output of light unit 24 must be adjusted to compensate for the distance D between light unit 24 and subject 10. The distance input to microcontroller 32 can be derived from any suitable source of a distance indicating signal. Examples include a distance signal from an autofocus system of camera 12, a mechanical or electronic linkage to the focus mechanism of the lens in camera 12, a distance sensor such as an ultrasonic or infrared distance sensor, or a manual input for estimated or measured distance. The circuit shown in the embodiment of FIG. 2 utilizes a potentiometer 60 to provide a manually-adjustable distance input signal. The potentiometer 60 is connected in series with resistors 61 and 62 between supply voltages $+V$ and $-E$. The distance input is connected to one of the analog inputs of microcontroller 32.

A third input to microcontroller 32 is a sensitivity control input from a potentiometer 64. The potentiometer 64 is connected in series with resistors 61 and 62 between supply voltages $+V$ and $-E$. The sensitivity control input adjusts the fill light provided by the lighting system to match a specific camera. The sensitivity control can be used to fine tune the other inputs to the microcontroller 32 in order to compensate for the variances in sensitivity among video and film cameras. The operator should only be required to set the sensitivity once by noting the visual results in the viewfinder of the camera 12. However, the operator can also use the sensitivity control to fine tune the light output at any time for creative effect or for any other reason. The sensitivity control input is connected to one of the analog inputs of microcontroller 32.

Power is typically supplied to the photographic lighting system 20 from a battery in the form of a positive voltage +E and a negative voltage −E. Positive voltage +E is supplied to lamps 40 and 50, to level shift circuits 36 and 46 and to a voltage regulator 70. The voltage regulator 70 provides a regulated voltage +V to the microcontroller 32, incident light sensor 26 and potentiometers 60 and 64.

The lighting system can incorporate a limit control to reduce the maximum light output so as to conserve battery power. The limit control can be two position switch 74 connected through a resistor 76 to an input of microcontroller 32 as shown in FIG. 2. In one position, the lighting system can provide full output power and in the other position can provide reduced output power. Alternatively, the limit control can be a potentiometer to provide a variable maximum output.

A variety of different lighting and lighting control techniques can be used in accordance with the invention. In the example of FIG. 2, the microcontroller 32 provides suitable control signals through resistors 34 and 44 to control the intensity of the fill light by energizing either one or both of lamps 40 and 50. Additional, individually-energized lamps can be provided. In this case, a predetermined fill light intensity is provided by energizing a selected number of lamps. Alternatively, the light output of lamps 40 and 50 can be controlled by varying the average power supplied to each of the lamps, such as by electronic pulse width modulation. The microcontroller 32 can generate pulses of suitable pulse width to provide a desired light output using the circuit shown in FIG. 2. Other techniques for controlling the average power supplied to lamps 40 and 50 are known to those skilled in the art. In general, it is preferable not to reduce the average power supplied to each lamp by more than about 10% from the rated value to avoid changing the color temperature of the lamp, which can adversely effect the photographic image obtained by camera 12.

Figure 3:
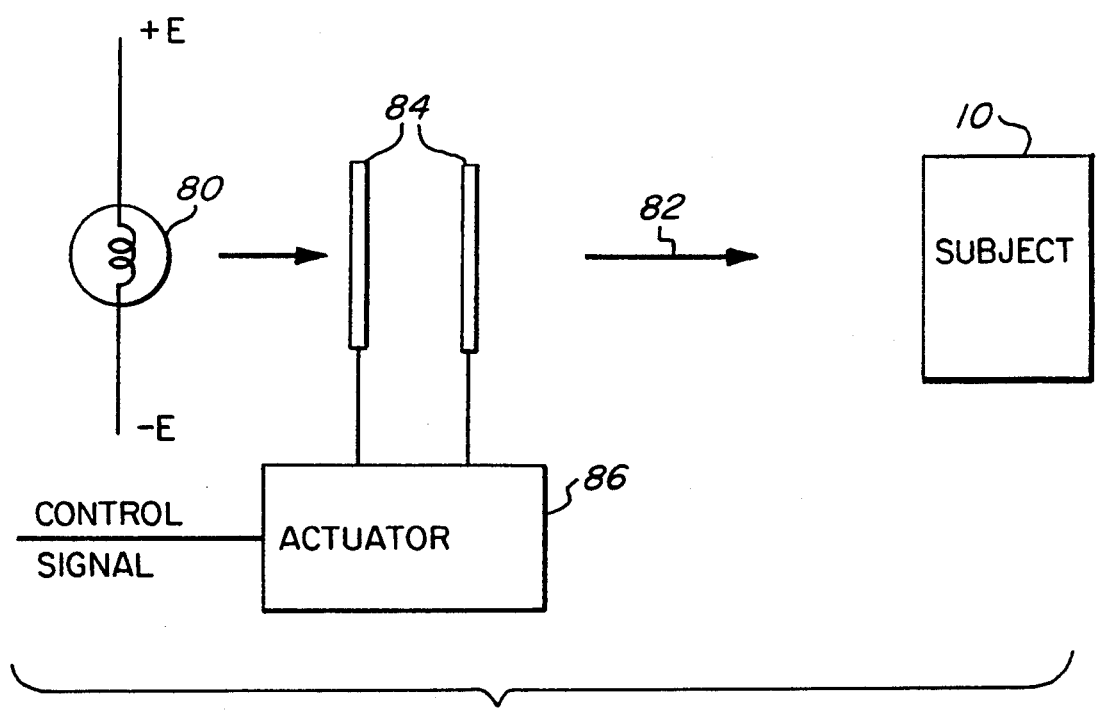
FIG. 3 is a schematic diagram of an alternative light control technique.

The above electric light configurations involve varying the electric energy supplied to the lamps to thereby vary the light output. According to another lighting technique shown in FIG. 3, one or more lamps 80 are energized at a fixed power level, and the fill light output 82 of the light unit is reduced with one or more diffusers and/or neutral density filters 84 positioned between the lamp 80 and the subject 10. The diffusers and/or neutral density filters and/or polarizers 84 are selectively positioned between the lamps and the subject 10 by an actuator 86 in response to a control signal from microcontroller 32 so as to attenuate the fill light intensity.

In operation, the microcontroller 32 provides suitable control signals to one or both of lamps 40 and 50 based on the incident light input, the distance input, the sensitivity control input and the limit control input. The fill light intensity at the subject is an increasing function of the incident light intensity sensed by sensor 26. Preferably, the fill light intensity is a linearly increasing function of the incident light intensity. However, other functions defining a positive relationship between the fill light intensity and the incident light intensity can be utilized within the scope of the present invention. Most preferably, the fill light intensity at the subject is approximately equal to the incident light from above (±1 'f' stop, which is equal to 0.5 to 2 times the incident light from above.) In most cases, this intensity is in the range of 30-60 footcandles and in some instances can be 20-100 footcandles.

As indicated above, the fill light intensity is adjusted to compensate for the distance D between the light unit 24 and the subject 10. Thus, the light output of lamps 40 and 50 is adjusted to increase in proportion to the square of the distance D so as to maintain a predetermined fill light intensity at the subject. However, the distance control input can be omitted in applications where subject distance is relatively standardized such as news reporting "stand-ups".

The sensitivity control input to microcontroller 32 is a desirable feature to fine tune the fill light output. However, for a given camera, the sensitivity control input can be omitted if desired. Similarly, the output limit control can be omitted if so desired. A typical relationship between the fill light output and the inputs to microcontroller 32 is $$\text{Fill Light} = \frac{K_0 \text{ (Incident Light) } K_1 \text{ (Distance)}}{K_2 \text{ (Sensitivity of Camera)}}$$

where $K_0$, $K_1$, and $K_2$ are proportionality constants. The microcontroller determines the required output signals based on the analog input signals in accordance with the above function to provide the required fill light intensity.

It will be understood that the function performed by the microcontroller 32, level shift circuits 36 and 46 and the related control circuitry can be performed by any suitable electronic circuitry. The primary requirement is to provide a fill light intensity at the subject which increases with incident light intensity and which is sufficient to eliminate or alleviate shadows in the photographic image. The fill light intensity is adjusted by a control unit which senses the incident light intensity and preferably a distance input to determine the required fill light intensity.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A photographic lighting apparatus for use with a camera, comprising:
    sensing means for generating an incident light signal representative of an incident light intensity on a subject to be photographed;
    electric light means for directing fill light toward said subject;
    means for generating a distance input representative of a distance between said electric light means and said subject;
    means for generating a sensitivity input representative of a sensitivity of said camera to light;
    means for attenuating light output from said electric light means while preserving a color temperature of said light output;
    control means for controlling the fill light provided by said electric light means and activating said means for attenuating light output from said electric light means
    in response to said incident light signal so that said fill light is controlled in accordance with a predetermined function such that said fill light is increased in intensity as the level of incident light intensity increases and in response to said distance input so that said fill light intensity at the subject is substantially independent of the distance between said light means and said subject and in response to said sensitivity input so that said fill light provided by said electric light means is compensated for the sensitivity of said camera to light.

2. A method of photographic lighting apparatus for use with a camera, comprising the steps of:

generating an incident light signal representative of an incident light intensity on a subject to be photographed;

directing fill light toward said subject;

generating a distance input representative of a distance between said electric light means and said subject;

generating a sensitivity input representative of a sensitivity of said camera to light;

controlling said fill light and activating means for attenuating light output from said fill light while preserving a color temperature of said fill light in response to said incident light signal so that said fill light is controlled in accordance with a predetermined function such that said fill light is increased in intensity as the level of incident light intensity increases and in response to said distance input so that said fill light intensity at the subject is substantially independent of the distance between said light means and said subject and in response to said sensitivity input so that said fill light provided by said electric light means is compensated for the sensitivity of said camera to light from said subject.

3. A photographic lighting apparatus as defined in claim 1 wherein said means for generating a distance input comprises means for sensing said distance.

4. A photographic lighting apparatus as defined in claim 1 wherein said means for generating a distance input comprises means for manually adjusting the distance input.

5. A photographic lighting apparatus as defined in claim 1 wherein said means for generating a distance input comprises means for coupling the distance to said subject input by the camera.

6. A photographic lighting apparatus as defined in claim 1 wherein said electric light means comprises a plurality of electric lamps and wherein a predetermined fill light intensity is provided by energizing one or more of said electric lamps.

7. A photographic lighting apparatus as defined in claim 1 wherein said control circuit means includes means for varying the average power supplied to said electric light means.

8. A photographic lighting apparatus as defined in claim 1 wherein said control circuit means includes means of varying light output.

9. A photographic lighting apparatus as defined in claim 1 wherein said light varying output means includes neutral density filters.

10. A photographic lighting apparatus as defined in claim 1 wherein said light varying output means includes diffusers selectively placed in front of said lamp.

11. A photographic lighting apparatus as defined in claim 1 wherein the fill light intensity provided at the subject is about the same as the incident light intensity.

12. A photographic lighting apparatus as defined in claim 1 wherein the fill light intensity provided at the subject is increased by said control circuit means in proportion to the incident light intensity.

13. A photographic lighting apparatus as defined in claim 1 wherein said sensing means comprises an incident light meter adapted for mounting on the camera.

14. A photographic lighting apparatus as defined in claim 13 wherein said incident light meter senses incident light from above the camera.

15. A photographic lighting apparatus as defined in claim 1 further including means for varying a maximum fill light output of said electric light means.

* * * * *